US012487547B2

(12) United States Patent
Misu et al.

(10) Patent No.: US 12,487,547 B2
(45) Date of Patent: Dec. 2, 2025

(54) IMAGE FORMING APPARATUS CAPABLE OF ENHANCING CONVENIENCE OF IMAGE FORMING APPARATUS TO WHICH PLURALITY OF DEVELOPER CONTAINERS CORRESPONDING TO DEVELOPER OF SAME COLOR CAN BE ATTACHED, AND IMAGE FORMING METHOD

(71) Applicant: KYOCERA Document Solutions Inc., Osaka (JP)

(72) Inventors: Kazuto Misu, Osaka (JP); Koichi Kimura, Osaka (JP); Masanori Taguchi, Osaka (JP); Seiya Fujimoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 24 days.

(21) Appl. No.: 18/665,316

(22) Filed: May 15, 2024

(65) Prior Publication Data

US 2024/0393716 A1 Nov. 28, 2024

(30) Foreign Application Priority Data

May 22, 2023 (JP) ................................ 2023-083886

(51) Int. Cl.
*G03G 15/08* (2006.01)
*G03G 15/00* (2006.01)

(52) U.S. Cl.
CPC ..... *G03G 15/5016* (2013.01); *G03G 15/0865* (2013.01); *G03G 15/0879* (2013.01); *G03G 2215/066* (2013.01)

(58) Field of Classification Search
CPC ........... G03G 15/0879; G03G 15/0865; G03G 15/0877; G03G 15/5016; G03G 2215/066
USPC .................................................. 399/258, 262
See application file for complete search history.

(56) References Cited

U.S. PATENT DOCUMENTS

| | | | | |
|---|---|---|---|---|
| 10,386,770 | B2 * | 8/2019 | Soda | G03G 15/0879 |
| 10,527,996 | B2 * | 1/2020 | Soda | G03G 15/0893 |
| 10,545,430 | B2 * | 1/2020 | Nohara | G03G 15/0879 |
| 2004/0052538 | A1 * | 3/2004 | Yugeta | G03G 15/0879 399/258 |
| 2016/0041498 | A1 * | 2/2016 | Terai | G03G 15/0865 399/262 |
| 2016/0170356 | A1 * | 6/2016 | Mabuchi | G03G 15/0872 399/27 |
| 2016/0259286 | A1 * | 9/2016 | Akiba | G03G 15/556 |

(Continued)

FOREIGN PATENT DOCUMENTS

JP 2016167058 A 9/2016

*Primary Examiner* — Robert B Beatty
(74) *Attorney, Agent, or Firm* — Alleman Hall & Tuttle LLP

(57) ABSTRACT

An image forming apparatus includes a supply control portion and a setting processing portion. The supply control portion makes a switch between a first mode for supplying developer from a developer container attached to a specific attachment portion that is one of a plurality of attachment portions to which a plurality of developer containers corresponding to developer of a same color can be attached and a second mode for supplying the developer from the plurality of developer containers attached to the plurality of attachment portions sequentially or in parallel. The setting processing portion sets the specific attachment portion based on a user operation.

6 Claims, 8 Drawing Sheets

(56) References Cited

U.S. PATENT DOCUMENTS

2024/0337961 A1* 10/2024 Katagiri ............ G03G 15/0879
2024/0345505 A1* 10/2024 Yoshioku ........... G03G 15/0867

* cited by examiner

IMAGE FORMING APPARATUS CAPABLE OF ENHANCING CONVENIENCE OF IMAGE FORMING APPARATUS TO WHICH PLURALITY OF DEVELOPER CONTAINERS CORRESPONDING TO DEVELOPER OF SAME COLOR CAN BE ATTACHED, AND IMAGE FORMING METHOD

INCORPORATION BY REFERENCE

This application is based upon and claims the benefit of priority from the corresponding Japanese Patent Application No. 2023-083886 filed on May 22, 2023, the entire contents of which are incorporated herein by reference.

BACKGROUND

The present disclosure relates to an image forming apparatus and an image forming method.

In general, there is known an image forming apparatus to which two developer containers corresponding to developer of the same color can be attached. In addition, there is also known an image forming apparatus which automatically uses, when an anomaly occurs in a driving portion which causes developer to be discharged from one of the developer containers, a driving portion which causes the developer to be discharged from the other one of the developer containers.

SUMMARY

An image forming apparatus according to an aspect of the present disclosure includes a supply control portion and a setting processing portion. The supply control portion makes a switch between a first mode for supplying developer from a developer container attached to a specific attachment portion that is one of a plurality of attachment portions to which a plurality of developer containers corresponding to developer of a same color can be attached and a second mode for supplying the developer from the plurality of developer containers attached to the plurality of attachment portions sequentially or in parallel. The setting processing portion sets the specific attachment portion based on a user operation.

An image forming method according to another aspect of the present disclosure includes executing, by a processor, a switch step and a setting step. The switch step includes making a switch between a first mode for supplying developer from a developer container attached to a specific attachment portion that is one of a plurality of attachment portions to which a plurality of developer containers corresponding to developer of a same color can be attached and a second mode for supplying the developer from the plurality of developer containers attached to the plurality of attachment portions sequentially or in parallel. The setting step includes setting the specific attachment portion based on a user operation.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, embodiments of the present disclosure will be described with reference to the drawings. It is noted that the following embodiments are examples of embodying the present disclosure and do not limit the technical scope of the present disclosure.

[Configuration of Image Forming Apparatus 10]

Figure 1:
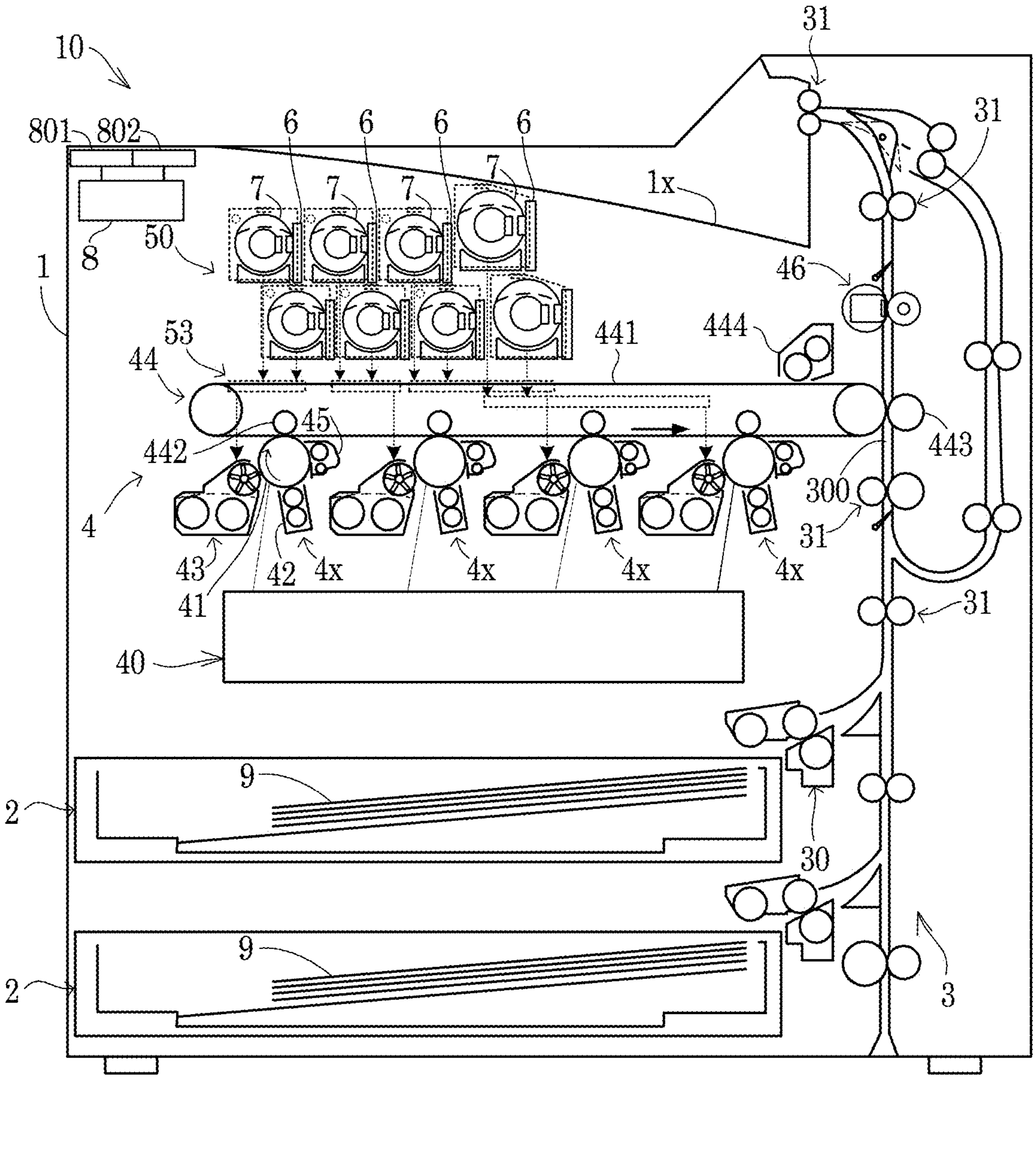
FIG. 1 is a configuration diagram of an image forming apparatus according to an embodiment.

An image forming apparatus 10 according to the present embodiment is capable of executing print processing for forming an image on a sheet 9. The image forming apparatus 10 shown in FIG. 1 is a printer. It is noted that the image forming apparatus 10 may alternatively be a copying machine, a facsimile apparatus, a multifunction peripheral, or the like.

As shown in FIG. 1, the image forming apparatus 10 includes a main housing 1, a sheet storing portion 2, a conveying device 3, a print device 4, a toner supplying portion 50, a control device 8, an operation device 801, and a display device 802. The main housing 1 is a housing that houses the conveying device 3, the print device 4, the toner supplying portion 50, and the control device 8.

A conveying path 300 which is a path of the sheet 9 is also provided in the main housing 1. The conveying device 3 includes a sheet feed mechanism 30 and a plurality of conveying roller pairs 31. The sheet feed mechanism 30 feeds the sheets 9 stored in the sheet storing portion 2 one by one to the conveying path 300. The plurality of conveying roller pairs 31 convey the sheet 9 along the conveying path 300. One pair out of the plurality of conveying roller pairs 31 discharges the sheet 9 on which an image has been formed by the print device 4 onto a discharge tray 1*x* from the conveying path 300.

The print device 4 executes the print processing on the sheet 9 conveyed along the conveying path 300. The print device 4 is an example of a print portion which forms an image on the sheet 9. In the example shown in FIG. 1, the print device 4 executes the print processing using electrophotography. It is noted that as another embodiment, the image forming apparatus 10 may alternatively be an inkjet image forming apparatus without being limited to the image forming apparatus that uses electrophotography.

The print device 4 that uses electrophotography includes an exposure device 40, one or more image forming portions 4*x*, a transfer device 44, and a fixing device 46. The print device 4 shown in FIG. 1 is a tandem-type color print device. In this case, the print device 4 includes a plurality of image forming portions 4*x* corresponding to a plurality of development colors. It is noted that as another embodiment, the image forming apparatus 10 may alternatively be a monochromatic print device without being limited to the color print device.

In the example shown in FIG. 1, the print device 4 includes four image forming portions 4*x* respectively corresponding to the development colors of yellow (Y), magenta (M), cyan (C), and black (K).

Each of the image forming portions 4*x* includes a photoconductor 41, a charging device 42, a developing device 43, and a first cleaning device 45. The photoconductor 41 rotates so that a surface of the photoconductor 41 is charged by the charging device 42.

The exposure device 40 scans laser light onto the charged surface of the photoconductor 41 to thus write an electrostatic latent image on the surface of the photoconductor 41. The developing device 43 supplies toner to the surface of the photoconductor 41 to develop the electrostatic latent image into a toner image.

The transfer device 44 transfers the toner image formed on the surface of the photoconductor 41 onto the sheet 9 conveyed along the conveying path 300. In the tandem-type print device 4, the transfer device 44 includes an intermediate transfer belt 441, a plurality of primary transfer devices 442, a secondary transfer device 443, and a second cleaning device 444. The plurality of primary transfer devices 442 are provided in correspondence with the plurality of image forming portions 4*x*.

The intermediate transfer belt 441 rotates in a state where a part thereof is provided along the plurality of image forming portions 4*x*. The plurality of primary transfer devices 442 respectively transfer the toner images formed on the surfaces of the photoconductors 41 of the plurality of image forming portions 4*x* onto a surface of the intermediate transfer belt 441. Thus, a color toner image obtained by combining the toner images of the plurality of colors is formed on the surface of the intermediate transfer belt 441.

The secondary transfer device 443 transfers the color toner image formed on the surface of the intermediate transfer belt 441 onto the sheet 9. The fixing device 46 heats and pressurizes the color toner image on the sheet 9 to thus fix the color toner image onto the sheet 9. It is noted that the sheet 9 is a sheet-type image forming medium such as a paper sheet.

The toner supplying portion 50 supplies toner to the developing device 43 of each of the plurality of image forming portions 4*x* in the print device 4. The toner supplying portion 50 includes a plurality of attachment portions 5. The attachment portions 5 are each a portion to which a toner container 7 is attached detachably.

The toner supplying portion 50 supplies the toner in the plurality of toner containers 7 attached to the plurality of attachment portions 5 to the developing devices 43 of the respective image forming portions 4*x* for each development color. The toner is an example of developer. Each of the toner containers 7 is an example of a developer container which stores the developer.

The operation device 801 is a device which accepts operations of people. For example, the operation device 801 includes one or both of a touch panel and operation buttons.

The display device 802 is capable of displaying various types of information. For example, the display device 802 is a panel display device such as a liquid crystal display device. The control device 8 controls various electric devices provided in the image forming apparatus 10.

Figure 2:
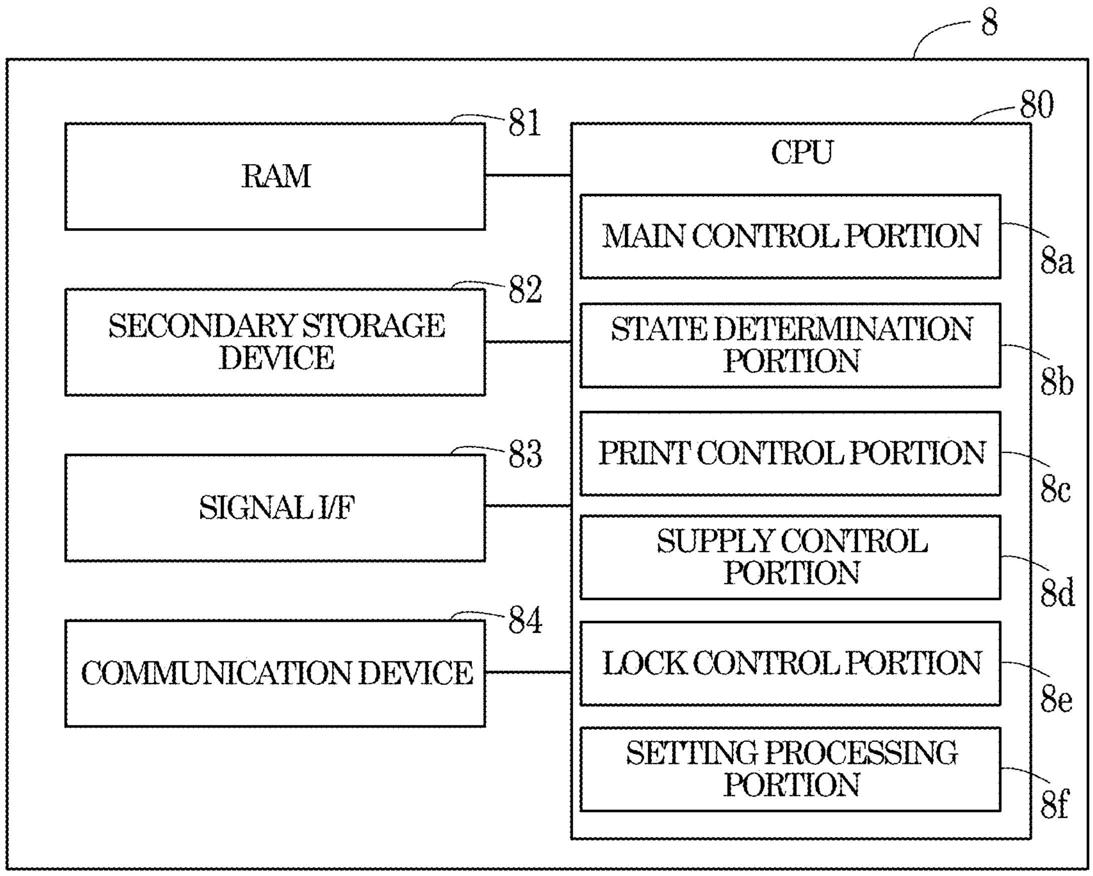
FIG. 2 is a block diagram showing a configuration of a control device in the image forming apparatus according to the embodiment.

As shown in FIG. 2, the control device 8 is a computer that includes a CPU (Central Processing Unit) 80, a RAM (Random Access Memory) 81, a secondary storage device 82, a signal interface 83, a communication device 84, and the like.

The CPU 80 is a processor that executes computer programs to thus execute various types of control and data processing. The RAM 81 temporarily stores the computer programs to be executed by the CPU 80 and various types of data.

The secondary storage device 82 is a nonvolatile computer-readable storage device. The secondary storage device 82 stores the computer programs to be executed by the CPU 80 and various types of data. For example, one or both of a flash memory and a hard disk drive is/are adopted as the secondary storage device 82.

The signal interface 83 converts detection signals of various sensors into digital detection data. The detection data is transmitted to the CPU 80.

The communication device 84 executes communication with a plurality of external apparatuses including one or more host apparatuses via a network. The CPU 80 executes communication with each of the external apparatuses via the communication device 84. The host apparatus is an information processing apparatus which requests the image forming apparatus 10 to execute the print processing.

The CPU 80 includes a plurality of processing modules that are realized by executing an image forming method including various steps according to the computer programs. The plurality of processing modules include a main control portion 8*a*, a state determination portion 8*b*, a print control portion 8*c*, a supply control portion 8*d*, a lock control portion 8*e*, a setting processing portion 8*f*, and the like (see FIG. 2).

The main control portion 8*a* executes control for causing the other modules to execute processing of accepting various requests and processing corresponding to the requests. For example, the main control portion 8*a* accepts a print request via the operation device 801 or the communication device 84. In addition, the main control portion 8*a* causes the print control portion 8*c* to execute processing corresponding to the print request.

The state determination portion 8*b* determines various states of the image forming apparatus 10 according to detection states of various sensors and operation states of various devices in the image forming apparatus 10.

The print control portion 8*c* controls the conveying device 3 and the print device 4. While causing the conveying device 3 to convey the sheet 9, the print control portion 8*c* causes the print device 4 to execute the print processing.

The supply control portion 8*d* controls the toner supplying portion 50 to control supply of toner from the toner supplying portion 50 to the print device 4.

Figure 3:
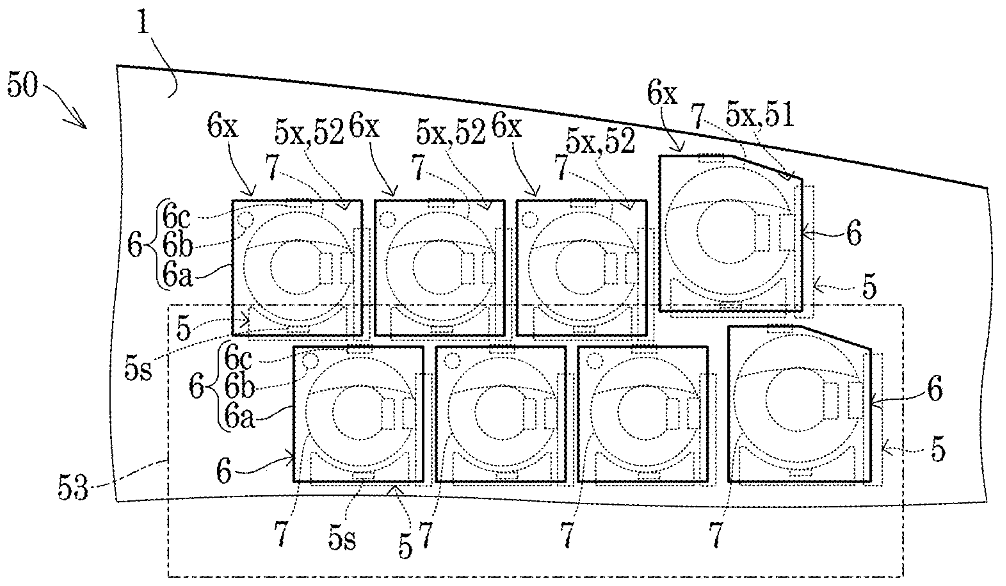
FIG. 3 is a configuration diagram of a toner supplying portion in the image forming apparatus according to the embodiment.

In the present embodiment, the toner supplying portion 50 includes a pair of attachment portions 5 for each of the plurality of development colors (see FIG. 3). The toner supplying portion 50 includes the pair of attachment portions 5 for each of the toner in the four colors of yellow, magenta, cyan, and black.

In other words, two toner containers 7 that store toner of the same color can be attached in the toner supplying portion 50. Thus, in the image forming apparatus 10, it is possible not to cause a downtime even during replacement of the toner container 7.

Incidentally, a user or administrator of the image forming apparatus 10 replaces the toner container 7 when a toner-empty state of the toner containers 7 is detected.

The toner-empty state is a state where there is no more toner left in the toner container 7. It is noted that a toner-remaining state is a state where there is still toner remaining in the toner container 7. The toner-empty state is an example of a developer-empty state, and the toner-remaining state is an example of a developer-remaining state.

In addition, when a state where a remaining toner amount in each of the toner containers 7 is low is detected, the user or the administrator may order the toner containers 7 for stock.

When the image forming apparatus 10 includes a plurality of attachment portions 5 for each of the development colors, various operations are conceivable regarding the ordering or replacement of the toner containers 7, and the like. Therefore, it is desirable for the image forming apparatus 10 to be capable of meeting the need for the various operations by the user or the administrator.

Hereinafter, the configuration and functions of the image forming apparatus 10 for meeting the need for the various operations by the user or the administrator will be described.

The toner supplying portion 50 includes four attachment portion sets 5*x* (see FIG. 3). The four attachment portion sets 5*x* respectively correspond to toner of yellow, magenta, cyan, and black. Yellow, magenta, cyan, and black are each an example of the development color.

The four attachment portion sets 5*x* each include the pair of attachment portions 5. Accordingly, the toner supplying portion 50 includes eight attachment portions 5. In each of the four attachment portion sets 5*x*, two toner containers 7 of the same color are attached to the pair of attachment portions 5. It is noted that in descriptions below, one of the attachment portions 5 included in the four attachment portion sets 5*x* may be referred to as a first attachment portion 5*a*, and the other one of the attachment portions 5 may be referred to as a second attachment portion 5*b*.

The four attachment portion sets 5*x* include one black-color attachment portion set 51 corresponding to black toner and three chromatic attachment portion sets 52 corresponding to toner of three chromatic colors. The three chromatic attachment portion sets 52 respectively correspond to yellow, magenta, and cyan.

In the example shown in FIG. 3, the pair of toner containers 7 attached to the one black-color attachment portion set 51 have a larger toner storage amount than the three pairs of toner containers 7 attached to the three chromatic attachment portion sets 52.

The toner supplying portion 50 further includes a supplying mechanism 53 and eight lock mechanisms 6 and eight toner amount sensors 5*s* corresponding to the eight attachment portions 5.

As will be described later, in each of the four attachment portion sets 5*x*, one of the pair of attachment portions 5 is selected as a target attachment portion. In descriptions below, one of the pair of toner containers 7 that is attached to the target attachment portion in each of the four attachment portion sets 5*x* may be referred to as a target container.

For each of the four attachment portion sets 5*x*, the supplying mechanism 53 supplies toner from the target container to the corresponding developing device 43. In other words, the target container becomes a toner supply source for the supplying mechanism 53 in each of the four attachment portion sets 5*x*.

The eight lock mechanisms 6 are sorted into four lock mechanism sets 6*x* respectively corresponding to the four attachment portion sets 5*x* (see FIG. 3). The four lock mechanism sets 6*x* correspond to the one black-color attachment portion set 51 and the three chromatic attachment portion sets 52. The four lock mechanism sets 6*x* each include a pair of lock mechanisms 6 corresponding to the pair of attachment portions 5.

It is noted that the eight lock mechanisms 6 can be considered as four pairs of lock mechanisms 6 corresponding to the four attachment portion sets 5*x*. Similarly, the eight toner amount sensors 5*s* can be considered as four pairs of toner amount sensors 5*s* corresponding to the four attachment portion sets 5*x*.

The eight toner amount sensors 5*s* respectively detect toner amounts in the eight toner containers 7 attached to the eight attachment portions 5. For example, each of the toner amount sensors 5*s* is a permeability sensor.

It is noted that each of the toner amount sensors 5*s* may be a plurality of photosensors that detect a toner retention level of each of the toner containers 7. Alternatively, each of the toner amount sensors 5*s* may be a load cell that measures a weight of each of the toner containers 7.

The state determination portion 8*b* determines a remaining toner amount of each of the toner containers 7 respectively attached to the attachment portions 5 based on the detection results of the toner amount sensors 5*s*. In the present embodiment, the state determination portion 8*b* is also capable of determining which of the toner-empty state and the toner-remaining state each of the toner containers 7 is in.

Under the condition that the toner-remaining state of the target container has been detected by the state determination portion 8*b*, the supply control portion 8*d* causes the supplying mechanism 53 to execute an operation of supplying toner of the target container to the developing device 43.

In other words, under the condition that the toner-remaining state of the target container has been detected, the supplying mechanism 53 executes the operation of supplying toner of the target container to the developing device 43.

In addition, the state determination portion 8*b* determines whether each of the toner containers 7 is in a low-toner-amount state as one type of the toner-remaining state. The low-toner-amount state is a state where the remaining toner amount of one of the plurality of toner containers 7 as the determination target is lower than a reference amount.

The reference amount is determined in advance. For example, the main control portion 8*a* can set the reference amount according to an operation to the operation device 801.

In addition, the state determination portion 8*b* determines which of an attached state and an unattached state each of the attachment portions 5 is in based on the detection results of the toner amount sensors 5*s*.

The attached state is a state where the toner container 7 is attached to one of the plurality of attachment portions 5 as the determination target. The unattached state is a state where the toner container 7 is not attached to one of the plurality of attachment portions 5 as the determination target.

In other words, the toner amount sensors 5*s* also function as attachment sensors that detect which of the attached state and the unattached state the respective attachment portions 5 are in.

When determining that one of the plurality of attachment portions 5 as the determination target is in the attached state, the state determination portion 8*b* executes processing of determining the toner-empty state or the toner-remaining state. In each of the attachment portions 5, the unattached state is an indefinite state where it is neither the toner-empty state nor the toner-remaining state.

The plurality of toner amount sensors 5*s* and the state determination portion 8*b* detect remaining toner amounts in the eight toner containers 7 attached to the eight attachment portions 5. In the present embodiment, the state determination portion 8*b* determining the remaining toner amount is synonymous with the state determination portion 8*b* detecting the remaining toner amount.

For example, the state determination portion 8*b* periodically detects the remaining toner amount of each of the toner containers 7. The state determination portion 8*b* may periodically determine which of the attached state and the unattached state each of the attachment portions 5 is in, and further detect the remaining toner amount of each of the toner containers 7 every time the print processing is executed.

Each of the lock mechanisms 6 is a mechanism that can be selectively switched between a locked state and an unlocked state. The locked state of each of the lock mechanisms 6 is a state where each of the toner containers 7 cannot be removed from the corresponding one of the attachment portions 5. The unlocked state of each of the lock mechanisms 6 is a state where each of the toner containers 7 can be removed from the corresponding one of the attachment portions 5.

In the present embodiment, each of the lock mechanisms 6 includes a container cover 6*a*, a cover sensor 6*b*, and a cover latch mechanism 6*c*. The container cover 6*a* can open and close an opening that communicates with one of the eight attachment portions 5 in the main housing 1.

According to an input lock control signal, the cover latch mechanism 6*c* is selectively switched between a state where the container cover 6*a* is latched at a closing position and a state where the latch of the container cover 6*a* is released. For example, the cover latch mechanism 6*c* includes a solenoid whose state is switched according to the lock control signal, and the like.

The state where the cover latch mechanism 6*c* latches the container cover 6*a* at the closing position is the locked state of the lock mechanism 6. The state where the cover latch mechanism 6*c* has released the latch of the container cover 6*a* is the unlocked state of the lock mechanism 6.

The cover sensor 6*b* detects which of a cover-opened state and a cover-closed state the container cover 6*a* is in. The cover-closed state is a state where the container cover 6*a* is present at the closing position. The cover-opened state is a state where the container cover 6*a* is not present at the closing position.

When each of the toner containers 7 is attached/detached to/from the corresponding one of the attachment portions 5, the corresponding container cover 6*a* is opened. For example, the cover sensor 6*b* is a non-contact photosensor, a contact-type microswitch, or the like.

The plurality of processing modules in the CPU 80 further include the lock control portion 8*e* (see FIG. 2). The lock control portion 8*e* outputs the lock control signal to the cover latch mechanism 6*c* of each of the lock mechanisms 6 to thus control each of the lock mechanisms 6.

The lock control portion 8*e* outputs the lock control signal to execute remaining-amount-compliant lock control for both of the pair of lock mechanisms 6 in each of the four attachment portion sets 5*x*. The remaining-amount-compliant lock control is control to set each of the corresponding pair of lock mechanisms 6 to one of the locked state and the unlocked state according to the detection state of the remaining toner amount obtained by the state determination portion 8*b* for each of the pair of toner containers 7.

Specifically, the lock control portion 8*e* sets the lock mechanism 6 corresponding to the toner container 7 for which the toner-remaining state has been detected to the locked state. On the other hand, the lock control portion 8*e* sets the lock mechanism 6 corresponding to the toner container 7 for which the toner-remaining state has not been detected to the unlocked state.

For each of the four attachment portion sets 5*x*, the supply control portion 8*d* selects one target attachment portion from the pair of attachment portions 5. The supply control portion 8*d* selects one target attachment portion for each of the four attachment portion sets 5*x*.

Incidentally, the image forming apparatus 10 to which the two toner containers 7 corresponding to the developer of the same color can be attached may have a configuration with which an operation mode can be switched between a first mode of using only one toner container 7 for the developer of the same color and a second mode of using the two toner containers 7. Herein, when the toner container 7 to be used in a case where the operation mode is the first mode is fixed to either one of the toner containers 7, the other toner container 7 cannot be used in the first mode. In contrast, in the image forming apparatus 10 according to the present embodiment, convenience of the image forming apparatus 10 to which the plurality of toner containers 7 corresponding to the developer of the same color can be attached is enhanced.

In descriptions below, one of the pair of toner containers 7 that is attached to the target attachment portion in each of the attachment portion sets 5*x* will be referred to as the target container. In each of the attachment portion sets 5*x*, the target container becomes the toner supply source for the supplying mechanism 53.

As an initial state, the supply control portion 8*d* selects one of the pair of attachment portions 5 as the target attachment portion. After that, in a case where the image forming apparatus 10 is in a plural mode as will be described later, the supply control portion 8*d* selects, when the determination state of the state determination portion 8*b* regarding the target container changes from the toner-remaining state to the toner-empty state, for example, the other one of the attachment portions 5 as the target attachment portion. Thus, toner is sequentially supplied from the plurality of toner containers 7 attached to the plurality of attachment portions 5. In addition, in the case where the image forming apparatus 10 is in the plural mode as will be described later, the supply control portion 8*d* alternately selects the pair of attachment portions 5 as the target attachment portion every time the print processing is executed in the image forming apparatus 10, for example. Thus, toner is supplied in parallel from the plurality of toner containers 7 attached to the plurality of attachment portions 5. Therefore, a situation where the downtime occurs can be avoided in the plural mode. Meanwhile, in a case where the image forming apparatus 10 is in a single mode such as a fixed mode or a remaining amount mode to be described later, the supply control portion 8*d* does not select another target attachment portion even when the determination state of the state determination portion 8*b* regarding the target container changes from the toner-remaining state to the toner-empty state.

[Operation Modes]

The image forming apparatus 10 according to the present embodiment has a plurality of operation modes related to the selection of the target attachment portion in each of the attachment portion sets 5*x* corresponding to the toner of the respective colors. Specifically, the operation modes include the fixed mode, the remaining amount mode, the plural mode, and the like. Then, the supply control portion 8*d* selects the target attachment portion in each of the attachment portion sets 5*x* according to the operation modes of the attachment portion sets 5*x* corresponding to the toner of the respective colors.

[Fixed Mode]

When the operation mode of the attachment portion set 5*x* is set to the fixed mode, the supply control portion 8*d* selects a predesignated one of the plurality of attachment portions 5 corresponding to the toner of the same color as the target attachment portion according to the user operation. In other words, the fixed mode is an operation mode in which only one of the plurality of attachment portions 5 corresponding to the same color is used and is an example of the first mode according to the present disclosure.

It is noted that for the attachment portion set 5*x* whose operation mode is the fixed mode, the lock control portion 8*e* sets the target attachment portion to the locked state by the lock mechanism 6 and sets the other attachment portion 5 that is not the target attachment portion to the unlocked state by the lock mechanism 6. In addition, when the toner container 7 is removed from the other attachment portion 5 that is not the target attachment portion, the lock control portion 8*e* sets the attachment portion 5 to the locked state by the lock mechanism 6 so that the toner container 7 cannot be attached to the attachment portion 5.

[Remaining Amount Mode]

When the operation mode of the attachment portion set 5*x* is set to the remaining amount mode, the supply control portion 8*d* selects, out of the plurality of attachment portions 5 corresponding to the same color, the attachment portion 5 whose remaining toner amount satisfies a usage condition that has been preset by the user operation. In other words, the remaining amount mode is also the operation mode in which only one of the plurality of attachment portions 5 corresponding to the same color is used and is an example of the first mode according to the present disclosure.

Therefore, in the fixed mode or the remaining amount mode, the supply control portion 8*d* does not select the another target attachment portion even when the determination state of the state determination portion 8*b* regarding the target container changes from the toner-remaining state to the toner-empty state. It is noted that the image forming apparatus 10 may have only one of the fixed mode and the remaining amount mode as the first mode according to the present disclosure.

[Plural Mode]

When the operation mode of the attachment portion set 5*x* is set to the plural mode, the supply control portion 8*d* selects, as the initial state, a new target attachment portion when the determination state of the state determination portion 8*b* regarding the target container changes from the toner-remaining state to the toner-empty state. In other words, the plural mode is an operation mode in which the plurality of attachment portions 5 corresponding to the same color are used sequentially or in parallel and is an example of the second mode according to the present disclosure.

It is noted that for the attachment portion set 5*x* whose operation mode is the plural mode, the lock control portion 8*e* sets the target attachment portion to the locked state by the lock mechanism 6 and sets the other attachment portion 5 that is not the target attachment portion to the unlocked state by the lock mechanism 6. Thus, in the image forming apparatus 10, it is also possible to replace the toner container 7 without causing the downtime.

The setting processing portion 8*f* sets the operation mode of each of the attachment portion sets 5*x* corresponding to the respective colors of the toner in accordance with the user operation. Herein, an example of a method of setting, by the setting processing portion 8*f*, the operation mode of the attachment portion set 5*x* according to the user operation will be described with reference to FIG. 4 and FIG. 5.

[Operation Mode Selection Processing]

When an operation mode selection start event occurs, the setting processing portion 8*f* executes operation mode selection processing including a step of switching the operation mode of each of the attachment portion sets 5*x*. For example, the operation mode selection start event is turning on of a power supply of the image forming apparatus 10. Further, the operation mode selection start event is detection of an operation mode selection start operation by the operation device 801. In addition, the operation mode selection start event may alternatively be reception of a start command from an external terminal device by the communication device 84. For example, the user operation in the operation mode selection processing is an operation to the operation device 801. Alternatively, the user operation may be an operation to an external terminal device communicable with the communication device 84.

Figure 4:
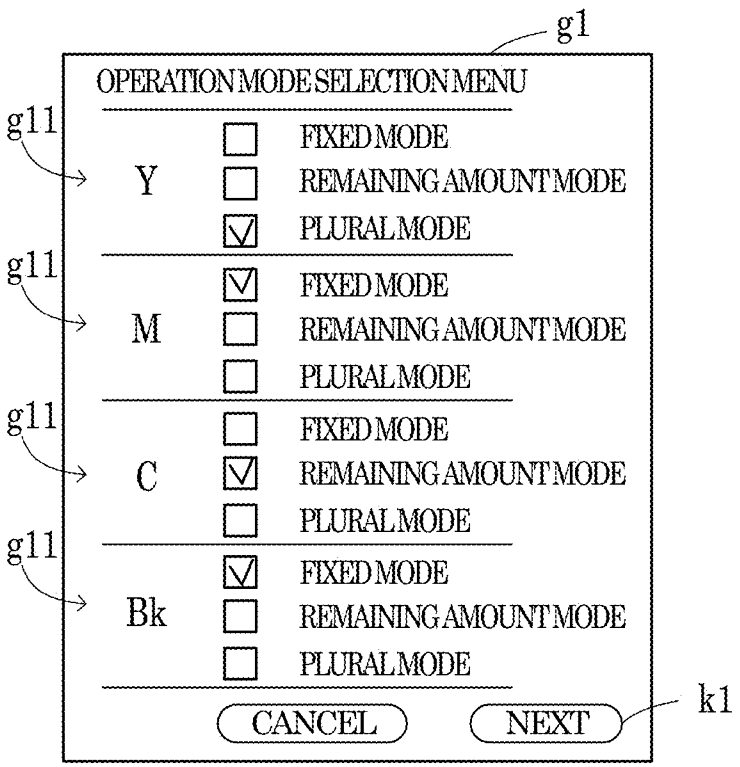
FIG. 4 is a diagram showing an example of a display screen in the image forming apparatus according to the embodiment.

First, in the operation mode selection processing, the setting processing portion 8*f* outputs a first menu screen g1 as shown in FIG. 4. An output destination of various display screens such as the first menu screen g1 to be described in the present embodiment is the display device 802 of the image forming apparatus 10 or the external terminal device. It is noted that the various display screens such as the first menu screen g1 to be described in the present embodiment may be displayed in full view at once according to a size of a display screen of the display device 802 or the external terminal device, or may be entirely displayed according to scroll operations or the like.

The first menu screen g1 includes a selection menu g11 for selecting any of the fixed mode, the remaining amount mode, and the plural mode for each of the four attachment portion sets 5*x* corresponding to the respective colors (Y, M, C, and Bk).

Specifically, in the selection menu g11, three selection candidates of the fixed mode, the remaining amount mode, and the plural mode are displayed. The setting processing portion 8*f* selects any of the selection candidates according to the user operation made in the first menu screen g1. It is noted that in the first menu screen g1, the plural mode is initially selected for all of the colors, for example, and the setting processing portion 8*f* alternatively selects the fixed mode, the remaining amount mode, or the plural mode according to the user operation.

Figure 5:
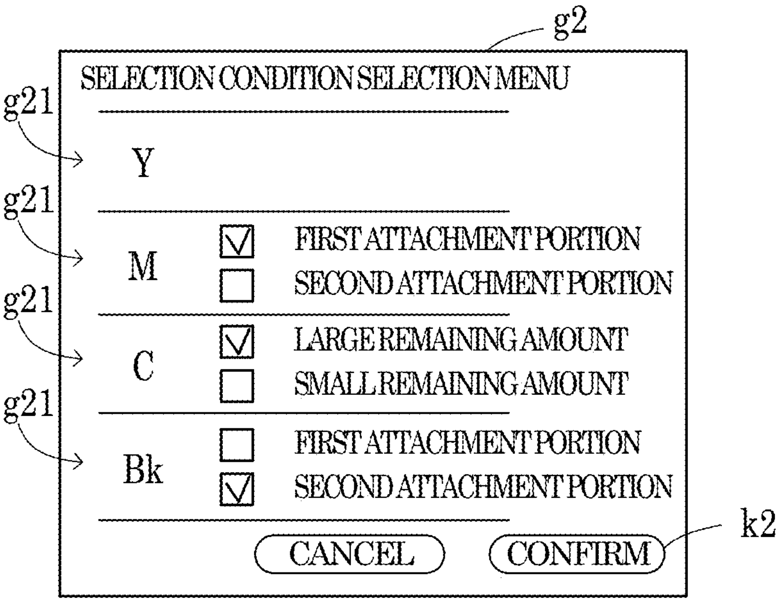
FIG. 5 is a diagram showing an example of the display screen in the image forming apparatus according to the embodiment.

Next, when an operation to an operation key k1 for causing a second menu screen g2 to be displayed is made in the first menu screen g1, the setting processing portion 8*f* outputs the second menu screen g2 as shown in FIG. 5.

The second menu screen g2 includes a selection menu g21 for selecting a selection condition for selecting the attachment portion 5 in the operation mode selected in the first menu screen g1, for each of the four attachment portion sets 5*x* corresponding to the respective colors.

Specifically, in the selection menu g21 corresponding to the attachment portion set 5*x* whose operation mode selected in the first menu screen g1 is the fixed mode, selection candidates for designating either one of the attachment portions 5 in the attachment portion set 5*x* as a specific attachment portion are displayed. For example, in the example shown in FIG. 5, the first attachment portion 5*a* and the second attachment portion 5*b* that are two attachment portions included in the attachment portion set 5*x* are displayed as the selection candidates. Then, the setting processing portion 8*f* sets either of the first attachment portion 5*a* and the second attachment portion 5*b* as the specific attachment portion according to the user operation made in the selection menu g21.

Further, in the selection menu g21 corresponding to the attachment portion set 5*x* whose operation mode selected in the first menu screen g1 is the remaining amount mode, selection candidates for selecting, as the selection condition, which of the attachment portion 5 having the largest remaining toner amount and the attachment portion 5 having the smallest remaining toner amount out of the attachment portion set 5*x* is to be set as the top priority are displayed. Then, the setting processing portion 8*f* sets either of the selection conditions as the specific attachment portion according to the user operation made in the selection menu g21.

It is noted that the selection candidates are not displayed in the selection menu g21 corresponding to the attachment portion set 5*x* whose operation mode selected in the first menu screen g1 is the plural mode. Moreover, when the plural mode is selected as the operation mode for all of the attachment portion sets 5*x* in the first menu screen g1, the second menu screen g2 does not need to be displayed. In addition, when the operation mode is the plural mode and the attachment portion set 5*x* includes three or more attachment portions 5, the number of attachment portions 5 to be usage candidates and the usage candidates may be capable of being selected from the three or more attachment portions 5 in the second menu screen g2.

After that, when an operation to an operation key k2 for confirming the operation mode setting processing is made in the second menu screen g2, the setting processing portion 8*f* confirms the setting contents that have been selected by the user operations in the first menu screen g1 and the second menu screen g2. Specifically, the setting processing portion 8*f* stores correspondence information in which each of the attachment portion sets 5*x* and the operation mode and selection condition selected in the first menu screen g1 are associated with each other in the secondary storage device 82. It is noted that when the operation mode is the fixed mode, the selection condition is a content designated by the user regarding the specific attachment portion. Thus, the supply control portion 8*d* selects the attachment portion 5 to be used in the attachment portion set 5*x* based on the correspondence information and supplies the toner from the toner container 7 attached to the attachment portion 5.

[Attachment Portion Setting Processing]

Figure 6:
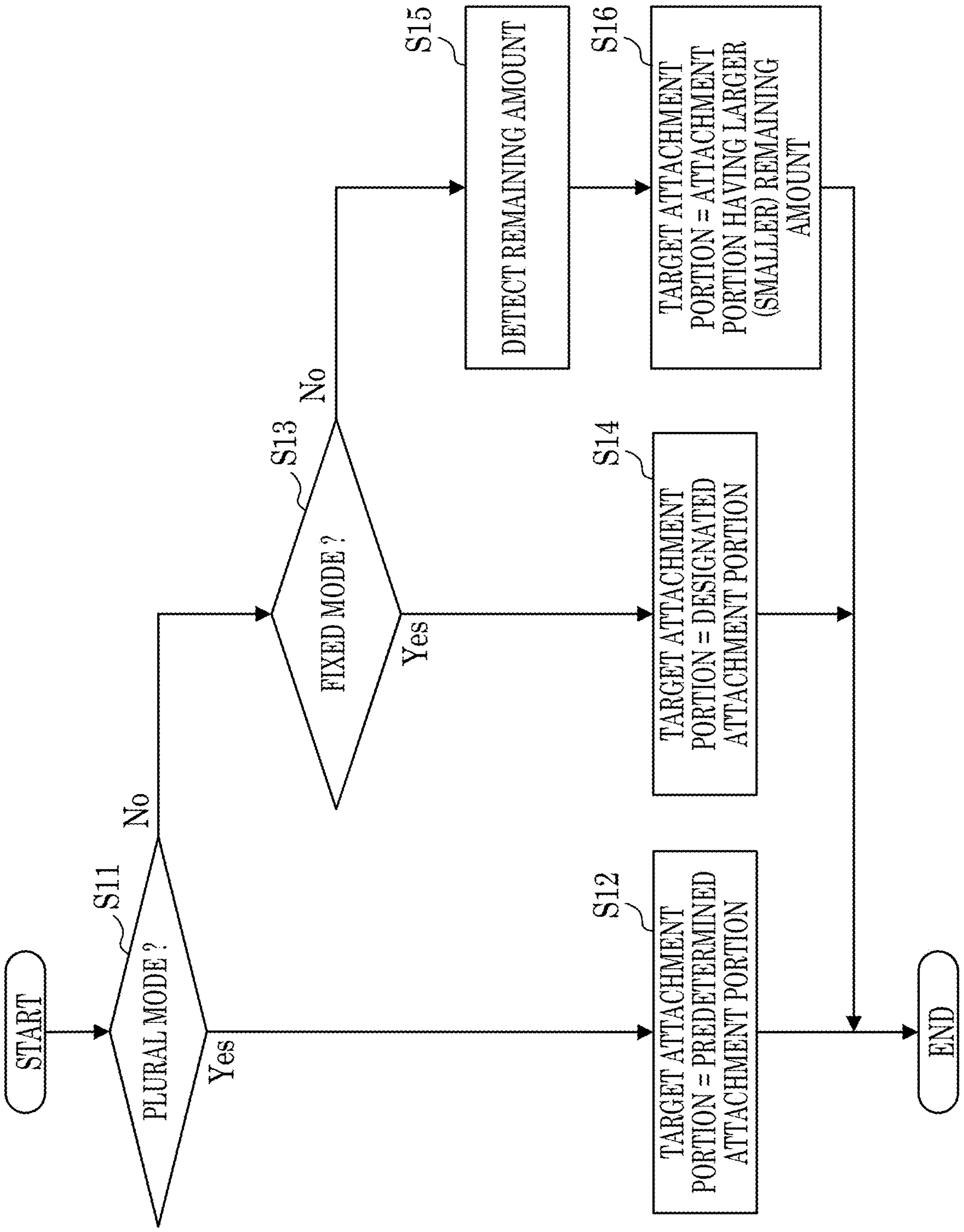
FIG. 6 is a flowchart showing exemplary procedures of processing executed in the image forming apparatus according to the embodiment.

Hereinafter, exemplary procedures of attachment portion setting processing executed by the setting processing portion 8*f* will be described with reference to the flowchart shown in FIG. 6. It is noted that the setting processing portion 8*f* executes the attachment portion setting processing when an attachment portion setting start event occurs. In other words, even after the operation mode selection processing is executed, the target attachment portion is not changed until the attachment portion setting start event occurs. For example, the attachment portion setting start event is one or a plurality of timings including turning on of the power supply of the image forming apparatus 10, transition from a power-saving mode to a normal operation mode, an elapse of a preset specific period, an arrival of a preset specific timing, and the like.

<Step S11>

In Step S11, the supply control portion 8*d* determines whether or not the operation mode of the attachment portion set 5*x* as a processing target is the plural mode based on the correspondence information stored in the secondary storage device 82, and branches the processing. Specifically, when the operation mode is the plural mode (S11: Yes), the processing shifts to Step S12, and when the operation mode is not the plural mode (S11: No), the processing shifts to Step S13.

<Step S12>

In Step S12, the supply control portion 8*d* sets a predetermined attachment portion 5 that has been set in advance as the target attachment portion in the plural mode. Thus, until the attachment portion setting processing is executed next, the supply control portion 8*d* controls supply of toner from the toner container 7 attached to the target attachment portion set in Step S12 to the print device 4.

Specifically, when the attachment portions 5 included in the attachment portion set 5*x* are used in a preset order in the plural mode of the image forming apparatus 10, the supply control portion 8*d* sets the attachment portion 5 according to the order in Step S12. On the other hand, when the attachment portions 5 included in the attachment portion set 5*x* are used in parallel in the plural mode of the image forming apparatus 10, the supply control portion 8*d* sets the attachment portion that is different from the attachment portion 5 that has been set as the target attachment portion in the last attachment portion setting processing in Step S12. It is noted that information on the attachment portion 5 that has been set as the target attachment portion in the last attachment portion setting processing is stored in the secondary storage device 82 by the supply control portion 8*d* according to the setting made in Step S12, for example. Further, in Step S12, when the attachment portions 5 included in the attachment portion set 5*x* are used in parallel in the plural mode of the image forming apparatus 10, the supply control portion 8*d* may set, as the target attachment portion, the attachment portion 5 having a larger remaining toner amount of the toner container 7 attached to the attachment portion 5, that is determined by the state determination portion 8*b*.

<Step S13>

In Step S13, the supply control portion 8*d* determines whether or not the operation mode of the attachment portion set 5*x* as the processing target is the fixed mode based on the correspondence information stored in the secondary storage device 82, and branches the processing. Specifically, when the operation mode is the fixed mode (S13: Yes), the processing shifts to Step S14, and when the operation mode is not the fixed mode (when the operation mode is the remaining amount mode) (S13: No), the processing shifts to Step S15.

For example, in the example shown in FIG. 4, the plural mode is selected for the attachment portion set 5*x* corresponding to yellow (Y), the fixed mode is selected for the attachment portion sets 5*x* corresponding to magenta (M) and black (Bk), and the remaining amount mode is selected for the attachment portion set 5*x* corresponding to cyan (C).

<Step S14>

In Step S14, the supply control portion 8*d* sets, as the target attachment portion, one specific attachment portion 5 predesignated as the selection condition corresponding to the attachment portion set 5*x* as the processing target based on the correspondence information stored in the secondary storage device 82. Thus, until the attachment portion setting processing is executed next, the supply control portion 8*d* controls the supply of toner from the toner container 7 attached to the target attachment portion set in Step S14 to the print device 4.

For example, in the example shown in FIG. 5, the first attachment portion 5*a* is selected for the attachment portion set 5*x* corresponding to magenta (M), and the second attachment portion 5*b* is selected for the attachment portion set 5*x* corresponding to black (Bk). In this case, the first attachment portion 5*a* as the specific attachment portion is set as the target attachment portion in the attachment portion set 5*x* corresponding to magenta (M), and the second attachment portion 5*b* as the specific attachment portion is set as the target attachment portion in the attachment portion set 5*x* corresponding to black (Bk).

<Step S15>

In Step S15, the supply control portion 8*d* acquires information on the remaining toner amounts of the toner containers 7 attached to the attachment portions 5, that are determined by the state determination portion 8*b*.

<Step S16>

In Step S16, the supply control portion 8*d* sets, as the target attachment portion, the specific attachment portion 5 whose remaining toner amount satisfies the selection condition corresponding to the attachment portion set 5*x* as the processing target based on the correspondence information stored in the secondary storage device 82. Thus, after that, until the attachment portion setting processing is executed next, the supply control portion 8*d* controls the supply of toner from the toner container 7 attached to the target attachment portion set in Step S16 to the print device 4.

For example, in the example shown in FIG. 5, the largest remaining toner amount is selected as the selection condition for the attachment portion set 5*x* corresponding to cyan (C). In this case, the specific attachment portion having the largest remaining toner amount of the attached toner container 7 out of the first attachment portion 5*a* and the second attachment portion 5*b* is set as the target attachment portion in the attachment portion set 5*x* corresponding to cyan (C). It is noted that as another embodiment, in Step S16, the target attachment portion may be selected based on the remaining toner amounts of the toner containers 7 attached to the respective attachment portions 5, that are determined by the state determination portion 8*b* when the remaining amount mode is selected as the operation mode in the operation mode selection processing.

As described heretofore, in the image forming apparatus 10, the target attachment portion is set arbitrarily based on the user operation made in advance for the attachment portion set 5*x* set in the fixed mode or the remaining amount mode (the first mode). Therefore, the image forming apparatus 10 realizes higher convenience than a configuration in which, in the operation mode of using only one of the attachment portions 5, only a predetermined one of the attachment portions 5 is used irrespective of an intention of the user.

It is noted that the image forming apparatus 10 may also be capable of determining whether or not the toner containers 7 attached to the respective attachment portions 5 of the attachment portion set 5*x* are specific type of toner containers that have been set in advance. In this case, when the specific type of toner container is attached to only one of the attachment portions 5 of the attachment portion set 5*x*, the supply control portion 8*d* may set the attachment portion 5 to which the specific type of toner container is attached as the target attachment portion. When the operation mode of the attachment portion set 5*x* is the remaining amount mode, the supply control portion 8*d* may limit the attachment portions 5 to be the selection candidates for the target attachment portion to the attachment portion 5 to which the specific type of toner container is attached out of the attachment portions 5. On the other hand, when the operation mode of the attachment portion set 5*x* is the fixed mode, the supply control portion 8*d* may also set the attachment portion 5 to which another type of toner container is attached as the target attachment portion without limiting the attachment portions 5 to be the selection candidates for the target attachment portion to the attachment portion 5 to which the specific type of toner container is attached out of the attachment portions 5.

Other Embodiments

Herein, other examples of the method of setting the operation mode in each of the attachment portion sets 5*x* will be described with reference to FIG. 7A to FIG. 7D.

Figure 7A:
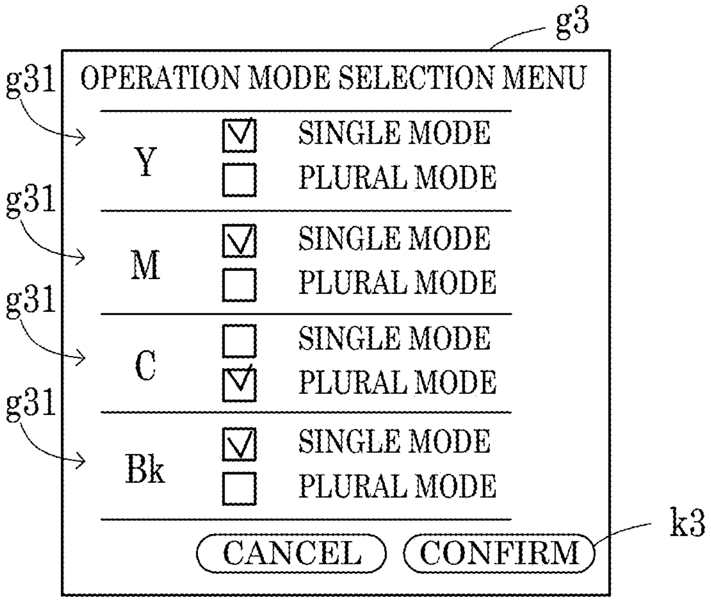
FIG. 7A is a diagram showing an example of the display screen in the image forming apparatus according to the embodiment.

First, in the operation mode selection processing, the setting processing portion 8*f* outputs a first menu screen g3 as shown in FIG. 7A. The first menu screen g3 includes a selection menu g31 for selecting either the single mode or the plural mode for each of the four attachment portion sets 5*x* corresponding to the respective colors (Y, M, C, and Bk). The setting processing portion 8*f* selects either the single mode or the plural mode according to the user operation made in the first menu screen g3.

Figure 7B:
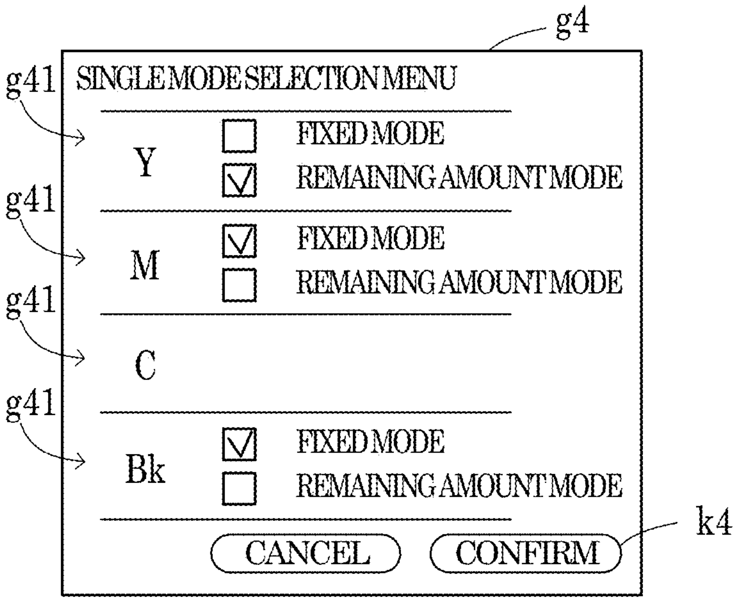
FIG. 7B is a diagram showing an example of the display screen in the image forming apparatus according to the embodiment.

Subsequently, when an operation to an operation key k3 for displaying a second menu screen g4 is made in the first menu screen g3, the setting processing portion 8*f* outputs the second menu screen g4 as shown in FIG. 7B. The second menu screen g4 includes a selection menu g41 for further selecting either the fixed mode or the remaining amount mode for each of the attachment portion sets 5*x* for which the single mode has been selected in the first menu screen g3. The setting processing portion 8*f* selects either the fixed mode or the remaining amount mode according to the user operation made in the second menu screen g4. It is noted that the selection candidates are not displayed in the selection menu g41 corresponding to the attachment portion set 5*x* whose operation mode selected in the first menu screen g3 is the plural mode. In addition, the second menu screen g4 does not need to be displayed when the plural mode is selected as the operation mode for all of the attachment portion sets 5*x* in the first menu screen g3.

Figure 7C:
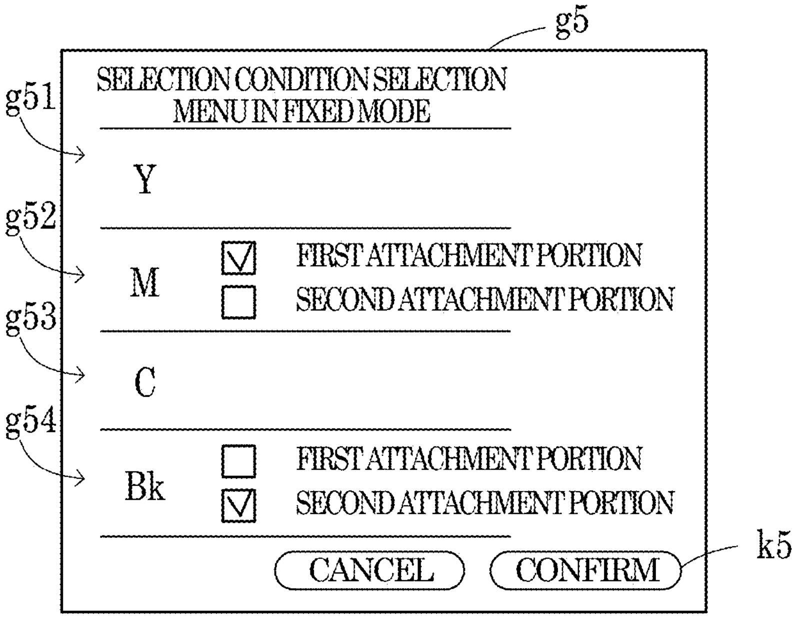
FIG. 7C is a diagram showing an example of the display screen in the image forming apparatus according to the embodiment.

Next, when an operation to an operation key k4 for displaying a third menu screen g5 is made in the second menu screen g4, the setting processing portion 8*f* outputs the third menu screen g5 as shown in FIG. 7C. The third menu screen g5 includes a selection menu g52, g54 for selecting the selection condition for selecting either one of the attachment portions 5 as the target attachment portion for each of the attachment portion sets 5*x* for which the fixed mode has been selected in the second menu screen g4. The setting processing portion 8*f* selects either one of the attachment portions 5 according to the user operation made in the third menu screen g5. It is noted that the selection candidates are not displayed in the selection menu g51, g53 corresponding to the attachment portion set 5*x* whose operation mode selected in the second menu screen g4 is the plural mode or the remaining amount mode. In addition, the third menu screen g5 does not need to be displayed when the plural mode or the remaining amount mode is selected as the operation mode for all of the attachment portion sets 5*x* in the first menu screen g3.

Figure 7D:
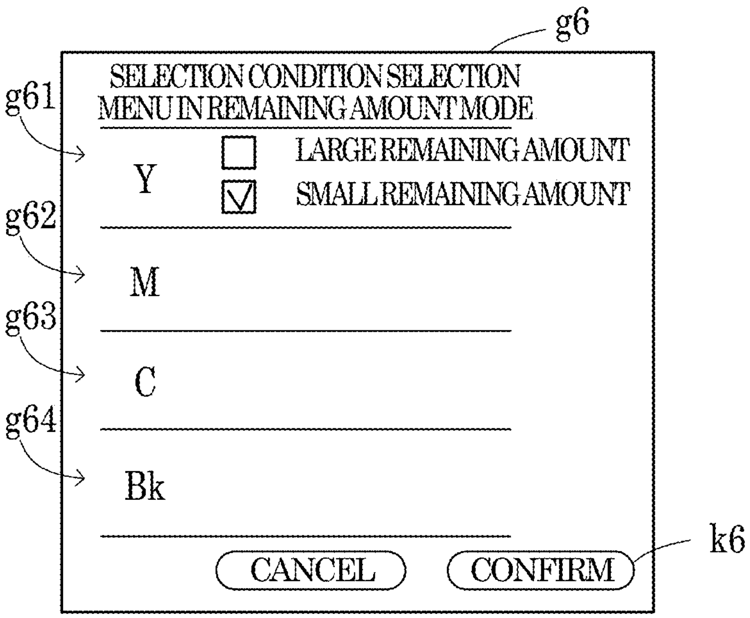
FIG. 7D is a diagram showing an example of the display screen in the image forming apparatus according to the embodiment.

On the other hand, when an operation to an operation key k5 for displaying a fourth menu screen g6 is made in the third menu screen g5, the setting processing portion 8*f* outputs the fourth menu screen g6 as shown in FIG. 7D. The fourth menu screen g6 includes a selection menu g61 for selecting the selection condition for selecting the attachment portion 5 as the target attachment portion based on the remaining toner amount for each of the attachment portion sets 5*x* for which the remaining amount mode has been selected in the second menu screen g4. The setting processing portion 8*f* selects either one of the attachment portions 5 according to the user operation made in the fourth menu screen g6. It is noted that the selection candidates are not displayed in the selection menu g62, g63, and g64 corresponding to the attachment portion set 5*x* whose operation mode selected in the second menu screen g4 is the plural mode or the fixed mode. In addition, the fourth menu screen g6 does not need to be displayed when the plural mode or the fixed mode is selected as the operation mode for all of the attachment portion sets 5*x* in the first menu screen g3.

After that, when an operation to an operation key k6 for confirming the operation mode setting processing is made in the fourth menu screen g6, the setting processing portion 8*f* confirms the setting contents selected by the user operations in the first menu screen g3 to the fourth menu screen g6.

Further, in the embodiment described above, the setting processing portion 8*f* is capable of individually setting the operation mode for each of the plurality of attachment portion sets 5*x* according to the user operation. Meanwhile, as another embodiment, the setting processing portion 8*f* may be capable of collectively setting the operation modes for all of the plurality of attachment portion sets 5*x* according to a user operation. In addition, as another embodiment, the setting processing portion 8*f* may be capable of setting the operation mode for the one black-color attachment portion set 51 and the operation mode for the three chromatic attachment portion sets 52 out of the plurality of attachment portion sets 5*x* according to user operations. Furthermore, the setting processing portion 8*f* may be capable of setting, after accepting a selection on an arbitrary color out of the plurality of toner colors, the operation mode, the selection condition, and the like for only the selected color.

Notes of Disclosure

Hereinafter, a general outline of the disclosure extracted from the embodiment described above will be noted. It is noted that the respective configurations and processing functions described in the notes below can be sorted and arbitrarily combined as appropriate.

Note 1

An image forming apparatus, including:

a supply control portion which makes a switch between a first mode for supplying developer from a developer container attached to a specific attachment portion that is one of a plurality of attachment portions to which a plurality of developer containers corresponding to developer of a same color can be attached and a second mode for supplying the developer from the plurality of developer containers attached to the plurality of attachment portions sequentially or in parallel; and a setting processing portion which sets the specific attachment portion based on a user operation.

Note 2

The image forming apparatus according to Note 1, in which the setting processing portion sets one of the plurality of attachment portions that has been designated by the user operation as the specific attachment portion.

Note 3

The image forming apparatus according to Note 1 or 2, in which the setting processing portion selects, according to the user operation, either one of a selection condition that a remaining amount of the developer in the attached developer container is largest out of the plurality of attachment portions and a selection condition that the remaining amount is smallest, and sets, according to the selection condition, the attachment portion having the largest remaining amount of the developer in the attached developer container or the attachment portion having the smallest remaining amount of the developer in the attached developer container as the specific attachment portion.

Note 4

The image forming apparatus according to Note 3, in which when a power supply of the image forming apparatus is turned on, the setting processing portion acquires the remaining amount of the developer in the developer container attached to each of the plurality of attachment portions, and sets the specific attachment portion based on the remaining amounts and the selection condition.

Note 5

The image forming apparatus according to any one of Notes 1 to 4, including the plurality of attachment portions respectively corresponding to colors of the developer, in which the setting processing portion sets the specific attachment portion for each of the colors of the developer.

Note 6

An image forming method, including:

executing, by a processor, a switch step of making a switch between a first mode for supplying developer from a developer container attached to a specific attachment portion that is one of a plurality of attachment portions to which a plurality of developer containers corresponding to developer of a same color can be attached and a second mode for supplying the developer from the plurality of developer containers attached to the plurality of attachment portions sequentially or in parallel; and a setting step of setting the specific attachment portion based on a user operation.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus, comprising:

a supply control portion which makes a switch between a first mode for supplying developer from a developer container attached to a specific attachment portion that is one of a plurality of attachment portions to which a plurality of developer containers corresponding to developer of a same color can be attached and a second mode for supplying the developer from the plurality of developer containers attached to the plurality of attachment portions sequentially or in parallel; and a setting processing portion which sets the specific attachment portion based on a user operation.

2. The image forming apparatus according to claim 1, wherein the setting processing portion sets one of the plurality of attachment portions that has been designated by the user operation as the specific attachment portion.

3. The image forming apparatus according to claim 1, wherein the setting processing portion selects, according to the user operation, either one of a selection condition that a remaining amount of the developer in the attached developer container is largest out of the plurality of attachment portions and a selection condition that the remaining amount is smallest, and sets, according to the selection condition, the attachment portion having the largest remaining amount of the developer in the attached developer container or the attachment portion having the smallest remaining amount of the developer in the attached developer container as the specific attachment portion.

4. The image forming apparatus according to claim 3, wherein when a power supply of the image forming apparatus is turned on, the setting processing portion acquires the remaining amount of the developer in the developer container attached to each of the plurality of attachment portions, and sets the specific attachment portion based on the remaining amounts and the selection condition.

5. The image forming apparatus according to claim 1, comprising the plurality of attachment portions respectively corresponding to colors of the developer, wherein the setting processing portion sets the specific attachment portion for each of the colors of the developer.

6. An image forming method, comprising:

executing, by a processor, a switch step of making a switch between a first mode for supplying developer from a developer container attached to a specific attachment portion that is one of a plurality of attachment portions to which a plurality of developer containers corresponding to developer of a same color can be attached and a second mode for supplying the developer from the plurality of developer containers attached to the plurality of attachment portions sequentially or in parallel; and a setting step of setting the specific attachment portion based on a user operation.

* * * * *